United States Patent
Weiser (10) Patent No.: US 11,206,849 B2
(45) Date of Patent: *Dec. 28, 2021

(54) FOOD PRODUCTS WITH SHELLS THAT ARE DISSOLVED OR MELTED TO RELEASE INGREDIENTS AND FORM HEATED BEVERAGES

(71) Applicant: Chocolate House Incubator Retail, LLC, Dallas, TX (US)

(72) Inventor: Katherine T. Weiser, Dallas, TX (US)

(73) Assignee: Chocolate House Incubator Retail, LLC, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/163,063

(22) Filed: Jan. 29, 2021

(65) Prior Publication Data

US 2021/0145019 A1    May 20, 2021

Related U.S. Application Data

(63) Continuation of application No. 15/050,079, filed on Feb. 22, 2016, now Pat. No. 10,959,445.

(60) Provisional application No. 62/127,694, filed on Mar. 3, 2015.

(51) Int. Cl.
| | | |
|---|---|---|
| *A23G 1/54* | (2006.01) | |
| *A23G 1/56* | (2006.01) | |
| *A23G 3/54* | (2006.01) | |
| *A23G 1/00* | (2006.01) | |
| *A23G 3/34* | (2006.01) | |

(52) U.S. Cl.
CPC ........... *A23G 1/545* (2013.01); *A23G 1/0076* (2013.01); *A23G 1/56* (2013.01); *A23G 3/0065* (2013.01); *A23G 3/545* (2013.01)

(58) Field of Classification Search
USPC .................................................. 426/593, 584
See application file for complete search history.

(56) References Cited

U.S. PATENT DOCUMENTS

| | | | |
|---|---|---|---|
| 4,925,683 A | 5/1990 | Fischbach et al. | |
| 4,980,181 A | 12/1990 | Camp et al. | |
| 5,882,710 A * | 3/1999 | Jury ....................... | A23G 1/207 426/512 |
| 2007/0196548 A1* | 8/2007 | Schmidt ................. | A23G 1/206 426/306 |
| 2010/0055254 A1* | 3/2010 | Hu ........................... | A23G 1/56 426/96 |
| 2012/0321750 A1* | 12/2012 | Kiene ...................... | A23G 1/46 426/93 |

OTHER PUBLICATIONS

Chocolate Covered Spoons/Marshmallow Sticks—Homemade Christmas Idea, Oct. 26, 2011.*

(Continued)

*Primary Examiner* — Lien T Tran (57) ABSTRACT

A food product includes first and second shells containing multiple ingredients. The first and second shells are attached to each other by an edible bonding agent. The shells are configured to be dissolved or melted into a heated liquid to release the multiple ingredients and the edible bonding agent is configured to be dissolved or melted into the heated liquid in order to form a heated beverage. The multiple ingredients include a first ingredient that dissolves into the heated liquid and a second ingredient.

20 Claims, 13 Drawing Sheets

(56) References Cited

OTHER PUBLICATIONS

GoodtoKnow "Chocolate snowman truffles", 2010.
Homemade Chocolate, 2013.
Ann Reardon, "Chocolate Cup Recipe", 2013.
Vangie Baga-Reyes, "20 Best Desserts for 2011", Oct. 27, 2011.
Image, Instagram post from "PuurChocolat," Dec. 13, 2014, 1 page.
Oreo Truffle Snowmen, "Kraft Food & Family" 2006.
Snowman Truffles, Dec. 28, 2014.
"Christmas Chocolate Spoons", https://cherishedbliss.com/christmas-chocolate-spoons/, Dec. 1, 2013, 16 pgs.

\* cited by examiner

FOOD PRODUCTS WITH SHELLS THAT ARE DISSOLVED OR MELTED TO RELEASE INGREDIENTS AND FORM HEATED BEVERAGES

CROSS-REFERENCE TO RELATED APPLICATION AND PRIORITY CLAIM

This application is a continuation of U.S. patent application Ser. No. 15/050,079 filed on Feb. 22, 2016, now U.S. Pat. No. 10,959,445, which claims priority under 35 U.S.C. § 119(e) to U.S. Provisional Patent Application No. 62/127,694 filed on Mar. 3, 2015. These applications are hereby incorporated by reference in their entirety.

TECHNICAL FIELD

This disclosure relates generally to food products. More specifically, this disclosure relates to food products with shells that are dissolved or melted to release ingredients and form heated beverages.

BACKGROUND

There are an overwhelming number of different types of confectionery products that are available for purchase by consumers. Confectionery products include products that are generally rich in sugars and carbohydrates, such as various forms of chocolate. The confectionery industry is constantly looking for new products that are unique or that capture consumer interest.

SUMMARY

This disclosure describes food products with shells that are dissolved or melted to release ingredients and form heated beverages.

In a first embodiment, a food product includes first and second shells containing multiple ingredients. The first and second shells are attached to each other by an edible bonding agent. The shells are configured to be dissolved or melted into a heated liquid to release the multiple ingredients and the edible bonding agent is configured to be dissolved or melted into the heated liquid in order to form a heated beverage. The multiple ingredients include a first ingredient that dissolves into the heated liquid and a second ingredient.

In a second embodiment, a method includes forming first and second shells. The method also includes placing multiple ingredients within the shells. The method further includes attaching the shells to each other using an edible bonding agent. The shells are configured to be dissolved or melted into a heated liquid to release the multiple ingredients and the edible bonding agent is configured to be dissolved or melted into the heated liquid in order to form a heated beverage. The multiple ingredients include a first ingredient that dissolves into the heated liquid and a second ingredient.

In a third embodiment, a method includes obtaining a food product comprising first and second shells that contain multiple ingredients within the shells and that are attached to each other by an edible bonding agent. The method also includes dissolving or melting the shells into a heated liquid to release the multiple ingredients and dissolving or melting the edible bonding agent into the heated liquid in order to form a heated beverage. The multiple ingredients include a first ingredient that dissolves into the heated liquid and a second ingredient.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases may be provided in this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1A through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1A:
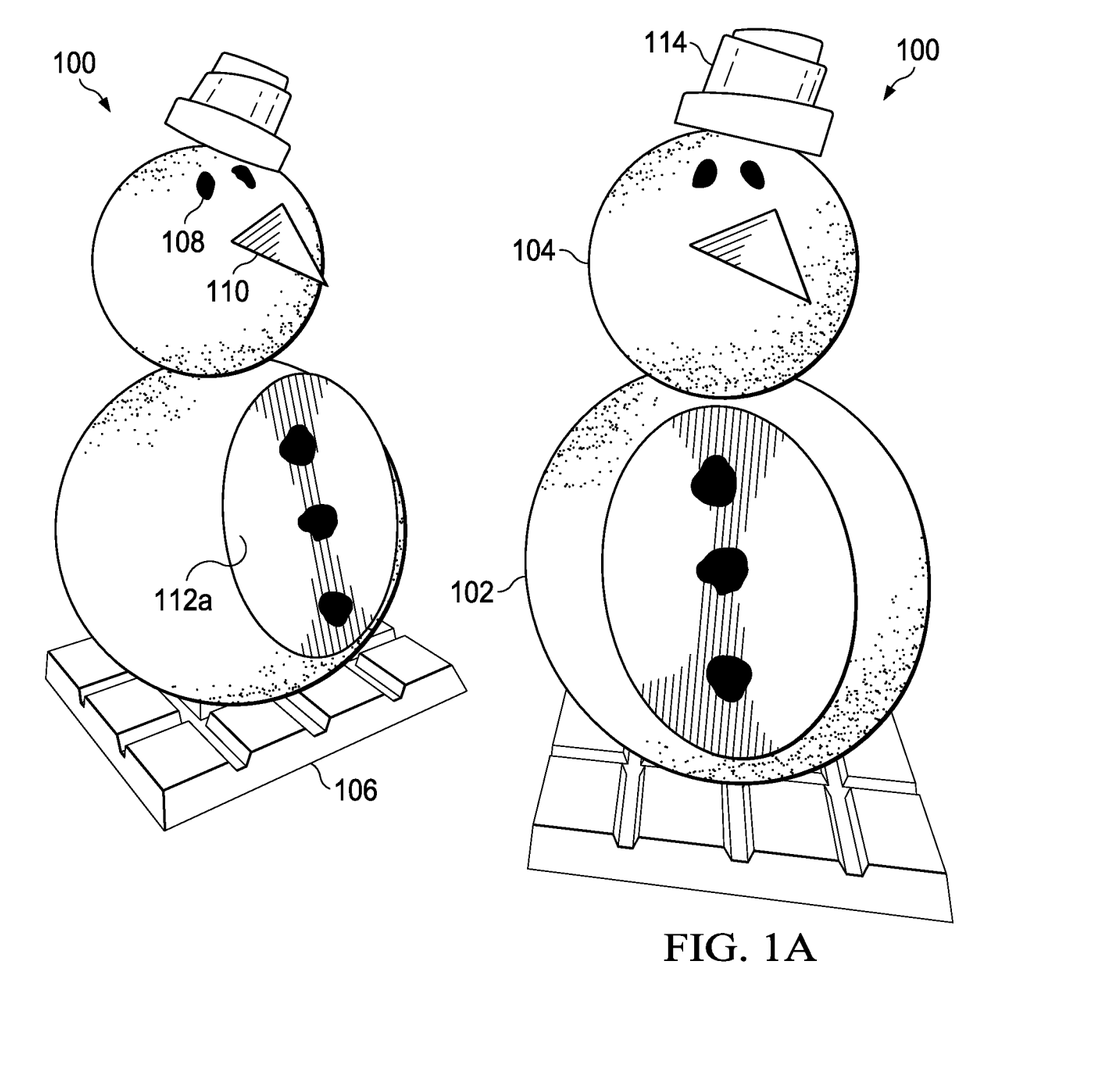
FIGS. 1A through 1C illustrate example food products in accordance with this disclosure.
Figure 1B:
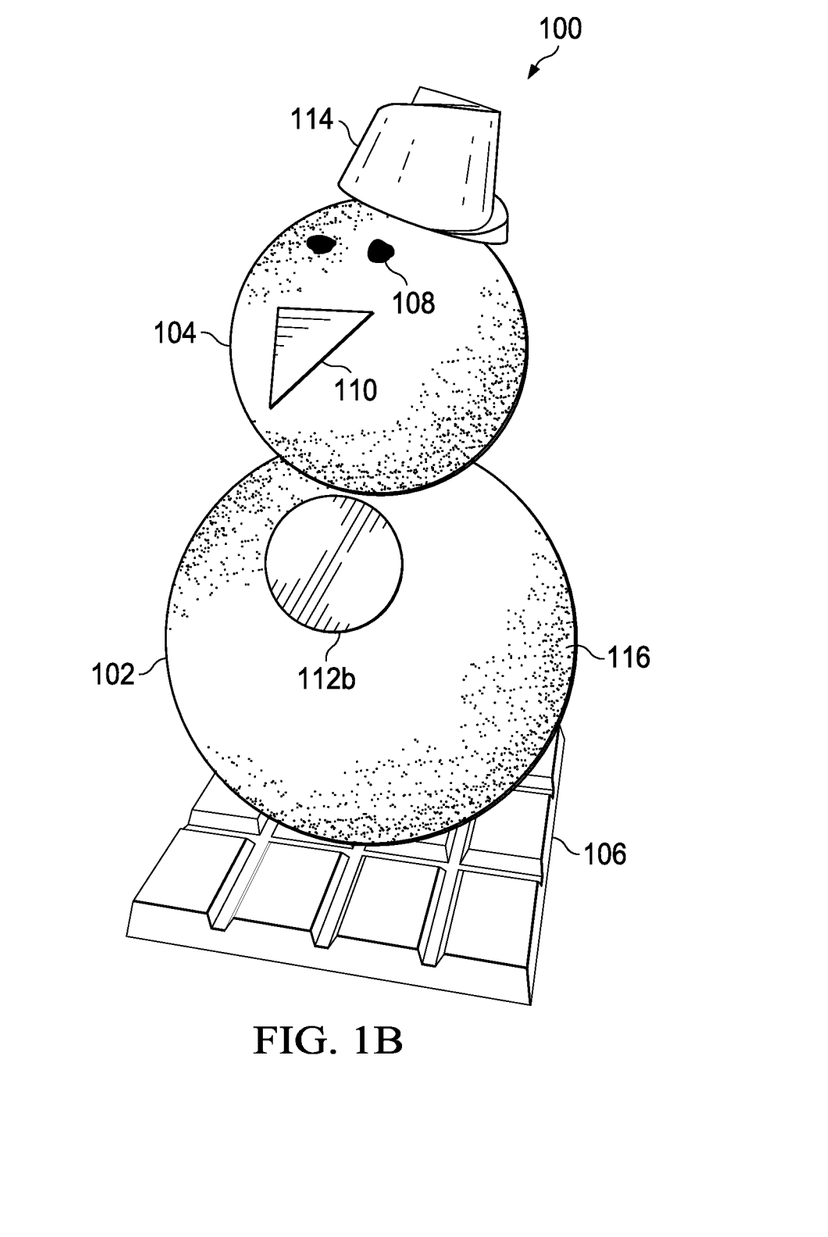
Figure 1C:
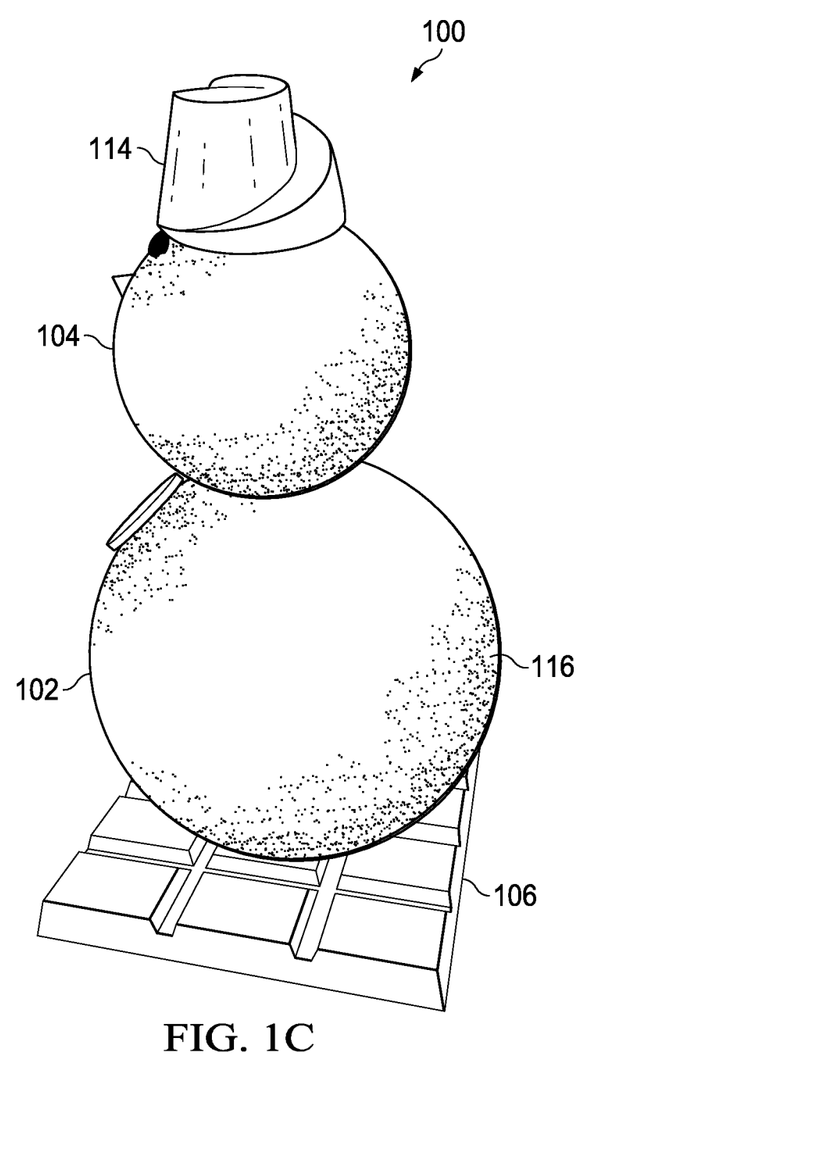

FIGS. 1A through 1C illustrate example food products 100 in accordance with this disclosure. The food products 100 denote confectionery products that can be formed completely or substantially completely from one or more edible components. The food products 100 can therefore be dissolved or melted into heated liquid to release ingredients and form heated beverages.

As shown in FIGS. 1A through 1C, each food product 100 includes a lower shell 102 and an upper shell 104. The upper shell 104 is connected to the lower shell 102, and the lower shell 102 is connected to a base 106. Each shell 102-104 could be formed from any suitable edible material(s), such as chocolate. Also, while shown as being generally spherical, each shell 102-104 could have any suitable regular or irregular shape. Further, while the shell 102 is shown as being larger than the shell 104, each shell 102-104 could have any suitable size and dimensions. In this example, the shells 102-104 are arranged and decorated to resemble a snowman, although any other suitable design could be used. The base 106 could similarly be formed from any suitable edible material(s), such as chocolate. The base 106 could also have any suitable size, shape, and dimensions.

As described below, each shell 102-104 is used to encase, hold, or otherwise contain one or more ingredients used for creating a heated beverage. Each shell 102-104 could contain one or more ingredients, and different shells 102-104 could contain the same ingredient(s) or different ingredients. As a particular example, the shell 102 could contain cocoa mix, and the shell 104 could contain marshmallows. However, this is for illustration only, and any suitable ingredients or divisions of ingredients could be used in the food products 100.

Various additional decorative features can be added to the shells 102-104 depending on the implementation of the food product 100. In this example, each food product 100 includes eyes 108, a nose 110, a front decoration 112*a*-112*b*, and a hat 114 placed on the shells 102-104. Different front decorations 112*a*-112*b* are shown here to illustrate that any of a wide variety of decorations could be used. Each of the components 108-114 could be formed from any suitable edible material(s), such as chocolate. Also, each shell 102-104 could be coated in one or more materials 116, such as sugar, white or other chocolate, or other ingredients.

By forming all or substantially all of the components of the food product 100 from edible ingredients, the entire food product 100 (or substantially the entire food product 100) can be placed into heated liquid in order to dissolve or melt the food product 100. For example, a specified amount of milk, half-and-half, cream, water, or other liquid could be heated, and the food product 100 could be placed whole or in parts into the heated liquid. The food product 100 could then dissolve or melt, releasing the ingredient(s) within the shells 102-104. In this way, the food products 100 provide a fun and enjoyable way to make heated beverages.

Although FIGS. 1A through 1C illustrate one example of a food product 100, various changes may be made to FIGS. 1A through 1C. For instance, the use of a snowman figure for the food product 100 is for illustration only. In general, a food product could include any number of shells (including a single shell) having any suitable shape, pattern, and arrangement. Also, the use of a base 106 is optional, and other approaches could be used to help stabilize the food product 100 in a given position (such as by flattening a bottom portion of the shell 102 or using a shell 102 with a non-rounded shape). In addition, the overall shape and size of the food product 100 could be varied according to particular needs. For example, the size of the food product 100 could vary depending on the number of servings of a heated beverage to be prepared. As another example, food products 100 of various shapes and patterns could be created, such as based on the season or upcoming holiday. As particular examples, one or more shells having a heart shape could be created and used around Valentine's Day, or various other designs could be used for Christmas or other winter holidays.

FIGS. 2A through 2E illustrate a first example technique for forming a food product in accordance with this disclosure. For ease of explanation, this technique is described with respect to the food product 100 of FIGS. 1A through 1C. However, this technique could be used to form any other suitable food product.

Figure 2A:
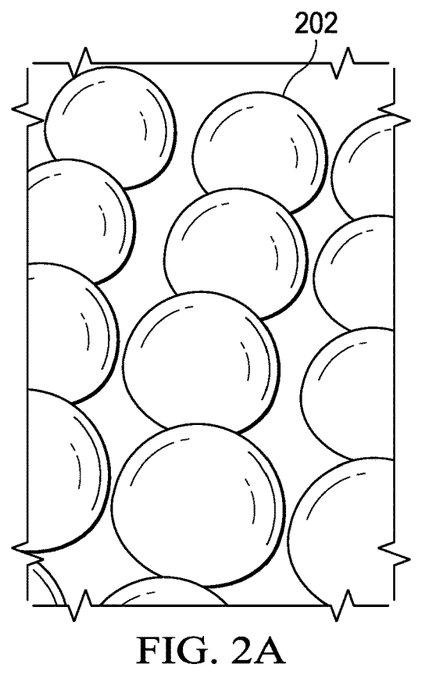
FIGS. 2A through 2E illustrate a first example technique for forming a food product in accordance with this disclosure.

As shown in FIG. 2A, multiple portions 202 of edible shells are obtained. The shell portions 202 could be formed from any suitable material(s), such as chocolate. The shell portions 202 could also be formed in any suitable manner, such as by using molds. In this example, the shell portions 202 roughly denote halves of shells to be joined together to create full spherical shells. However, non-equal portions of spherical shells or equal or non-equal portions of non-spherical shells could also be used.

Figure 2B:
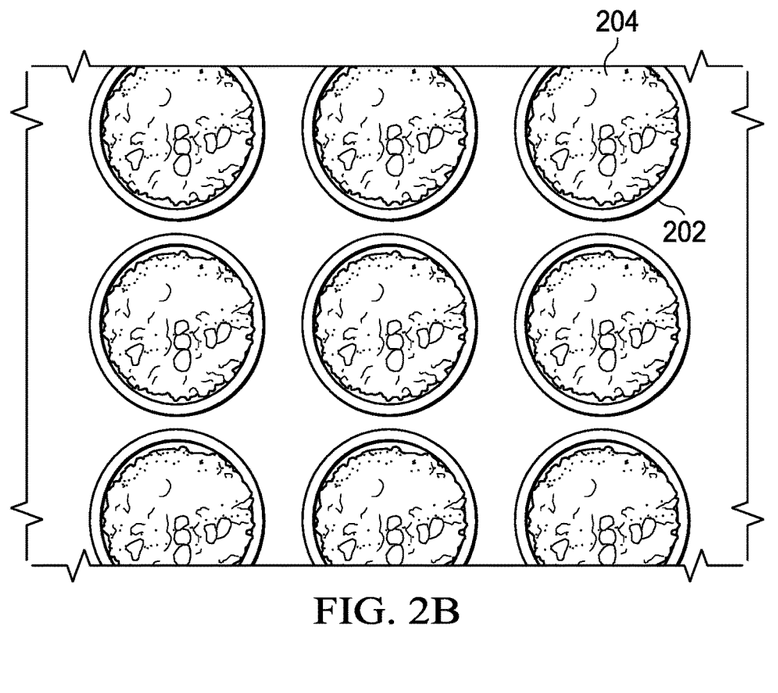

As shown in FIG. 2B, one or more ingredients 204 are placed into the different portions 202 of the shells. In this example, the ingredients 204 include cocoa mix, although this is for illustration only. Other or additional ingredients 204 could also be used. For instance, as noted above, different ingredients 204 could be placed into different shell portions 202, such as cocoa mix in some shell portions 202 and marshmallows in other shell portions 202.

Figure 2C:
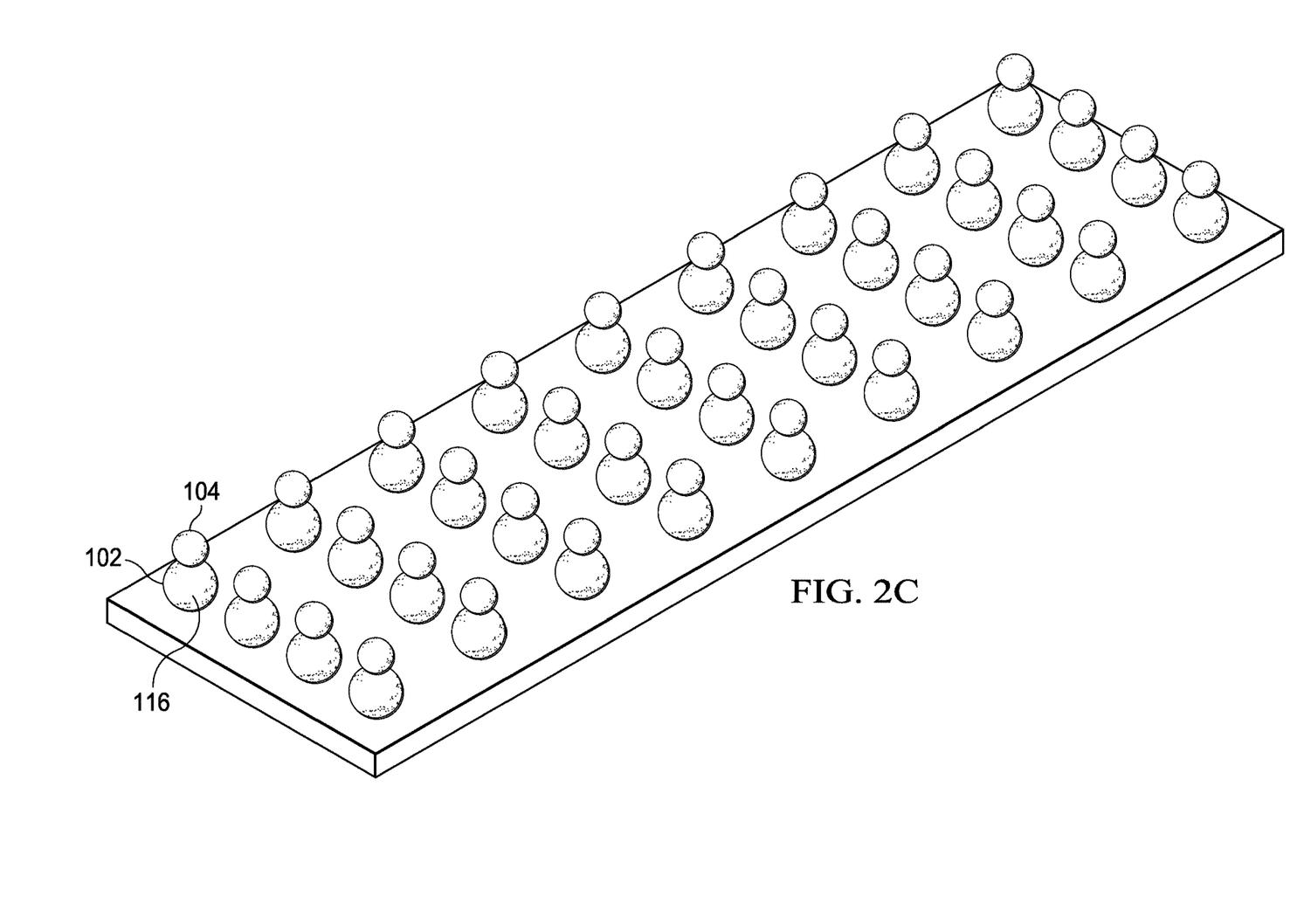

As shown in FIG. 2C, the shell portions 202 have been joined together to form the shells 102-104. For example, two shell halves could be joined together using chocolate or other edible bonding agent. This secures the ingredient(s) 204 inside the shells 102-104. In FIG. 2C, the shells 104 have also been connected to corresponding shells 102. Again, two shells could be joined together using chocolate or other edible bonding agent. However, any other suitable technique could be used to connect the shell portions 202, such as by heating the periphery of the shell portions 202 to cause the shell portions 202 to partially melt and connect to one another. In addition, the shells 102-104 here have been coated using one or more materials 116 for decoration.

Figure 2D:
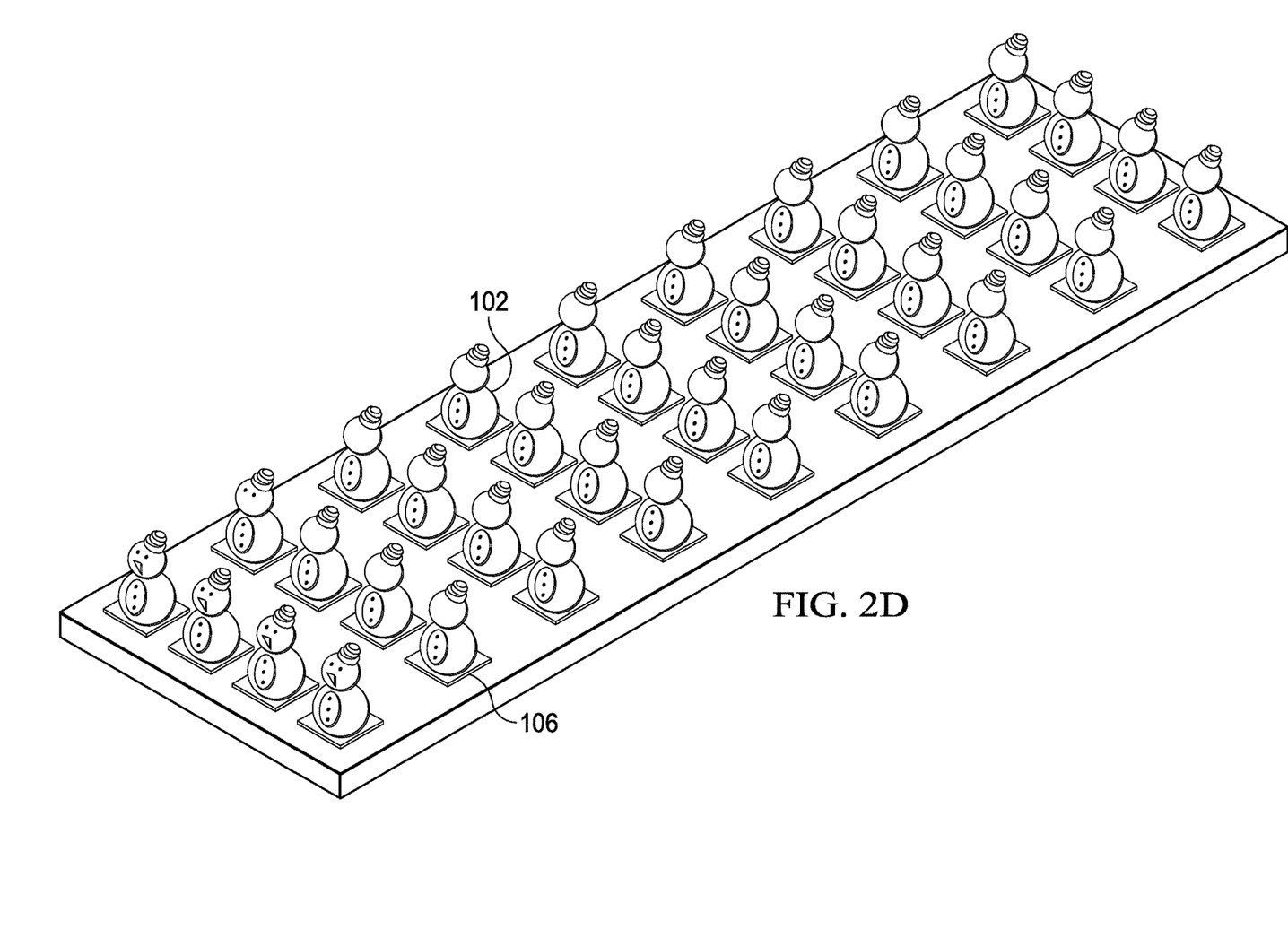
Figure 2E:
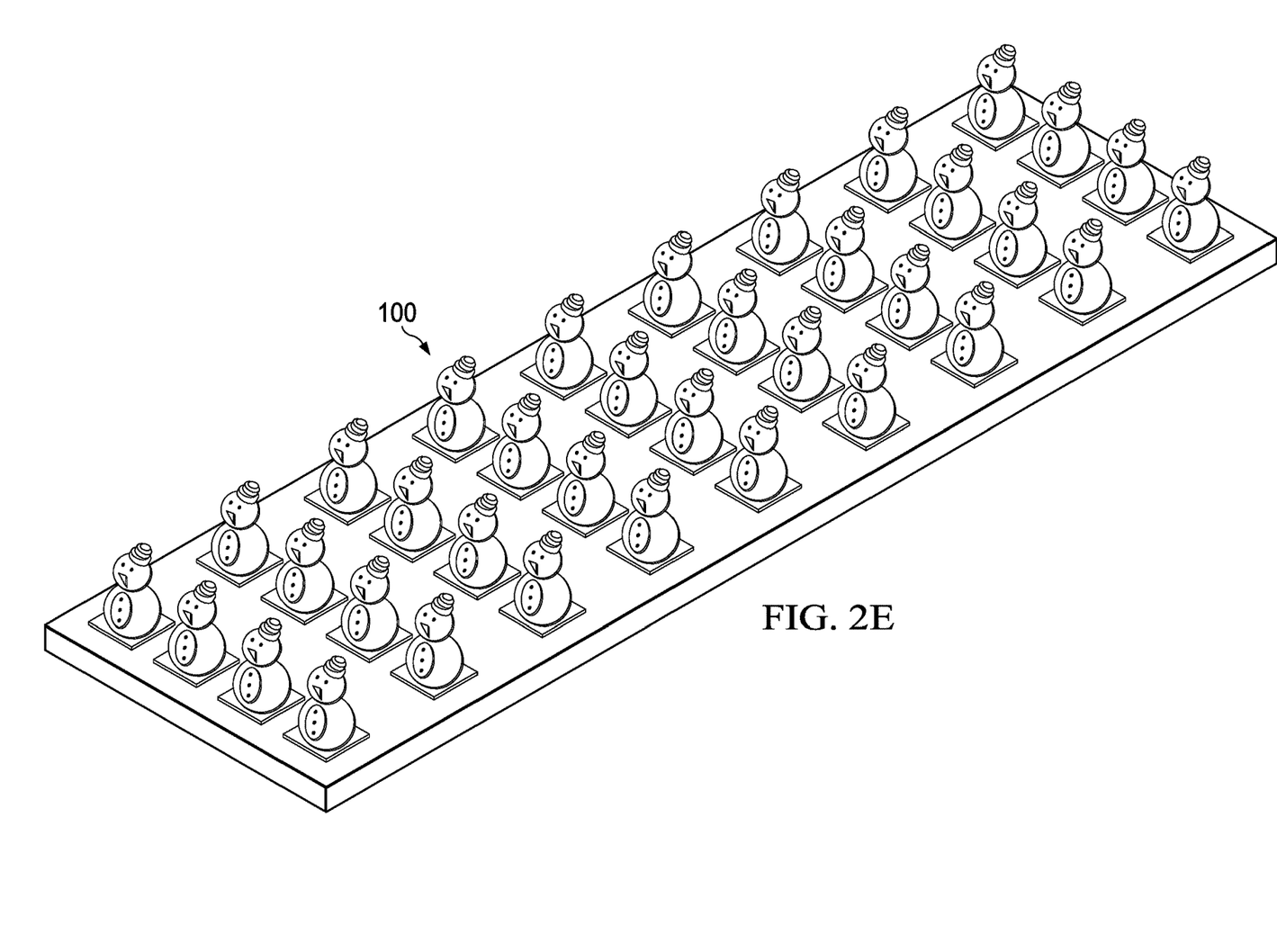

As shown in FIG. 2D, the lower shells 102 are being secured to corresponding bases 106, such as by using chocolate or other edible bonding agent. Also, various additional decorative features are being added to the shells 102-104. In FIG. 2D, this is being done manually, although an automated process could also be used. As shown in FIG. 2E, the food products 100 are substantially completed. At this point, the food products 100 could be packaged individually (as shown in FIG. 1A) or in groups or otherwise prepared for use, sale, or transport.

Figure 3:
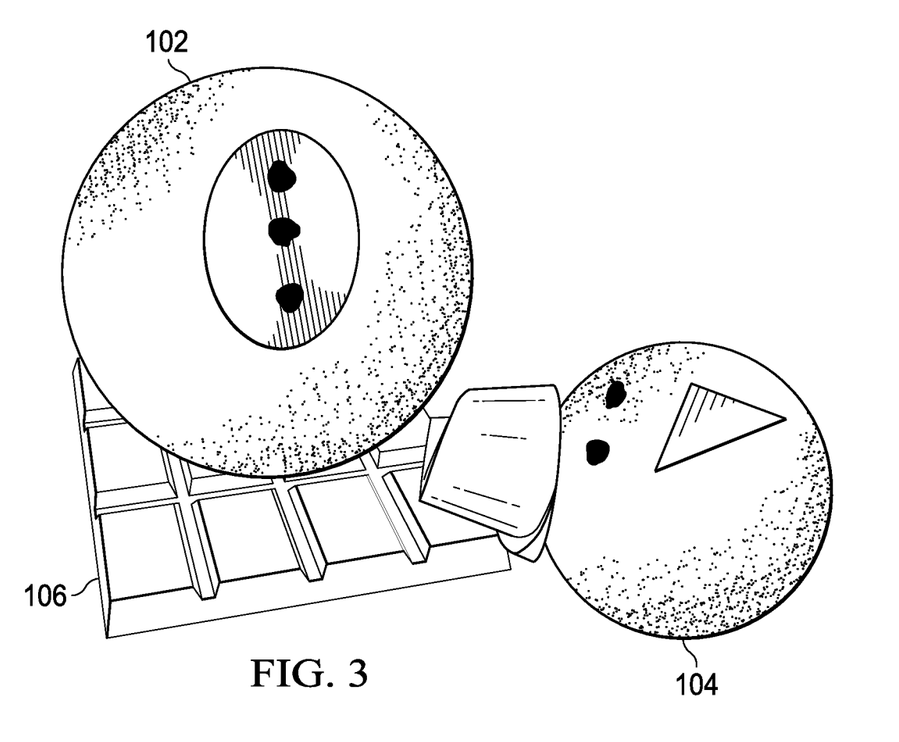
FIG. 3 illustrates a second example technique for forming a food product in accordance with this disclosure.

FIG. 3 illustrates a second example technique for forming a food product 100 in accordance with this disclosure. In this example, the shells 102-104 can be formed as described above using the shell portions 202. Each of the shells 102-104 could also be separately decorated using various decorative features, such as those described above. The fully decorated shell 102 could be connected to the base 106, and the fully decorated shell 104 could be connected to the shell 102 (in any order).

Although FIGS. 2A through 2E and FIG. 3 illustrate example techniques for forming a food product, various changes may be made to FIGS. 2A through 2E and FIG. 3. For example, these techniques are for illustration only. In general, any suitable steps performed in any suitable order could be used to form the food products 100.

Figure 4:
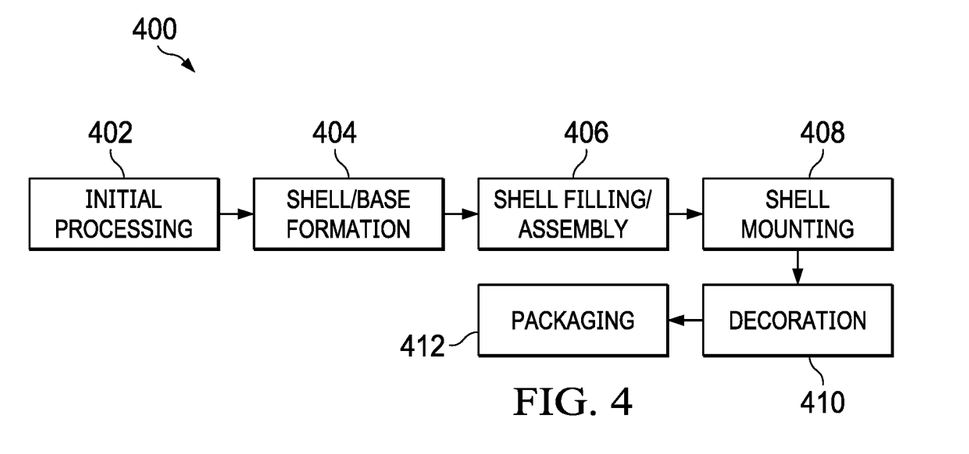
FIG. 4 illustrates an example system for manufacturing a food product in accordance with this disclosure.

FIG. 4 illustrates an example system 400 for manufacturing a food product in accordance with this disclosure. For ease of explanation, the system 400 is described with respect to the food product 100 of FIGS. 1A through 1C. However, the system 400 could be used to manufacture any other suitable food product. As noted above, the food products 100 could be manufactured manually or using an automated system. FIG. 4 illustrates an example of such an automated system.

As shown in FIG. 4, the system 400 includes initial processing equipment 402, which prepares raw or intermediate ingredients for use in manufacturing the food products 100. For example, the initial processing equipment 402 could include equipment used to prepare chocolate for shell preparation, cocoa ingredients for mixing, and marshmallows. One or more of the ingredients could also be manufactured on-site.

Shell/base formation equipment 404 manufactures shell portions 202 and bases 106 to be used for the food products 100. For example, the shell/base formation equipment 404 could include equipment used to mold or otherwise use chocolate or other materials to manufacture the shell portions 202. Also, the shell/base formation equipment 404 could include equipment used to mold or otherwise use chocolate or other materials to manufacture the bases 106.

Shell filling/assembly equipment 406 dispenses one or more ingredients 204 into the shell portions 202 and connects the shell portions 202 to form filled shells 102-104. For example, the shell filling/assembly equipment 406 could include equipment used to dispense powdered or other ingredients into the shell portions 202. Also, the shell filling/assembly equipment 406 could include equipment used to dispense chocolate or other edible bonding agent onto one or more of the shell portions 202 and to connect the shell portions 202 using the bonding agent.

Shell mounting equipment 408 mounts the filled shells 102-104 to the bases 106 and/or to each other. For example, the shell mounting equipment 408 could include equipment used to dispense chocolate or other edible bonding agent onto the shells 102 or bases 106 in order to couple the shells 102 to the bases 106. Also, the shell mounting equipment 408 could include equipment used to dispense chocolate or other edible bonding agent onto the shells 102 or 104 to couple the shells 102 to the shells 104.

Decoration equipment 410 places any desired decoration(s) onto the shells 102-104, and packaging equipment 412 packages the finished food products for transport or sale. For example, the decoration equipment 410 could include equipment used to dispense chocolate or other edible bonding agent onto the shells 102-104, base 106, or decorative items and equipment used to place the decorative items on the shells 102-104 or base 106. Also, the packaging equipment 412 could include equipment used to place the food products 100 into clear or other suitable packaging.

Each of the equipment 402-412 shown in FIG. 4 could be implemented using any suitable components. Also, any suitable equipment could be used to transport items between the equipment 402-412, such as conveyor belts, trays, or other mechanism.

Although FIG. 4 illustrates one example of a system 400 for manufacturing a food product, various changes may be made to FIG. 4. For example, the functional division of FIG. 4 is for illustration only. Various equipment in FIG. 4 could be combined, further subdivided, rearranged, or omitted and additional equipment could be added according to particular needs. As a particular example, one or more decorative features could be placed onto the shells 102-104 or the base 106 prior to assembly of the shells 102-104 to one another or prior to assembly of the shells 102-104 on the base 106.

Figure 5:
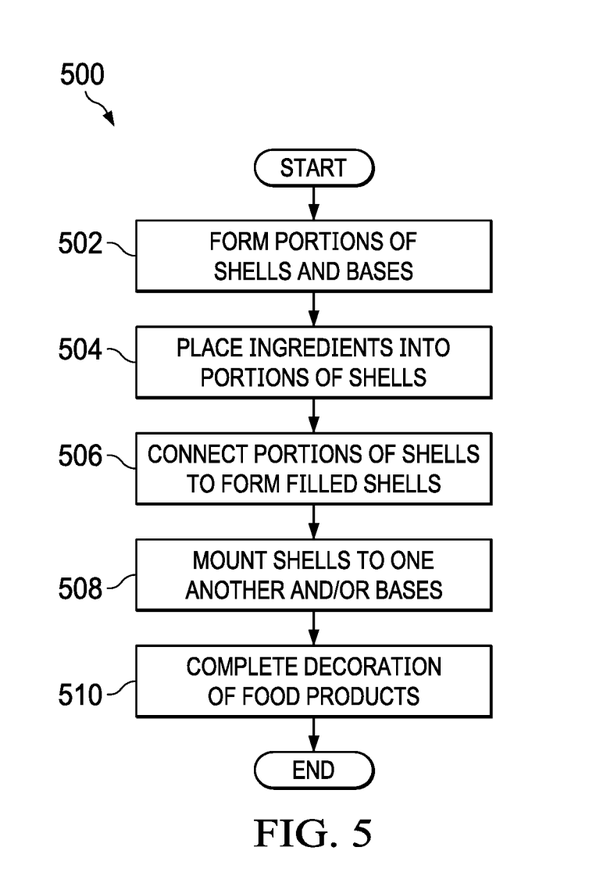
FIG. 5 illustrates an example method for creating a food product in accordance with this disclosure.

FIG. 5 illustrates an example method 500 for creating a food product in accordance with this disclosure. For ease of explanation, the method 500 is described with respect to the food product 100 of FIGS. 1A through 1C. However, the method 500 could be used to form any other suitable food product. Also, the method 500 here could be performed manually or in an automated manner.

As shown in FIG. 5, portions of shells and bases for food products are formed at step 502. This could include, for example, molding chocolate or other materials to manufacture the shell portions 202 and the bases 106 of the food products 100. One or more ingredients are placed into the shell portions at step 504. This could include, for example, dispensing powdered or other ingredients 204 into the shell portions 202. The shell portions are connected to form filled shells at step 506. This could include, for example, dispensing chocolate or other edible bonding agent onto one or more of the shell portions 202 and connecting the shell portions 202. Note, however, that any other suitable technique could be used to connect the shell portions 202.

The filled shells can then be handled and used to form the food products 100. For example, at least one shell could be mounted to a base and/or multiple shells could be mounted to each other at step 508. This could include, for example, dispensing chocolate or other edible bonding agent onto the shell 102 or base 106 to couple these components and/or dispensing chocolate or other edible bonding agent onto the shell 102 or 104 to couple these components. The arrangement of one or more shells with or without a base can vary depending on the design of the food products. Decoration of the food products is completed at step 510. This could include, for example, attaching edible decorations to the base or shells using chocolate or other edible bonding agent.

Although FIG. 5 illustrates one example of a method 500 for creating a food product, various changes may be made to FIG. 5. For example, while shown as a series of steps, various steps in FIG. 5 could overlap, occur in parallel, occur in a different order, or occur any number of times. As a particular example, one or more decorative features could be placed onto the shells 102-104 or the base 106 prior to the shells 102-104 being connected to one another or to the base 106. Also, manufacture of the base 106 could be omitted if the base is not used in the food products.

FIGS. 6 through 12 illustrate additional example food products in accordance with this disclosure. Each of these food products denotes a food product in which at least one edible shell contains one or more ingredients, where the shell(s) can be dissolved or melted to release the ingredient(s) and form a heated beverage.

Figure 6:
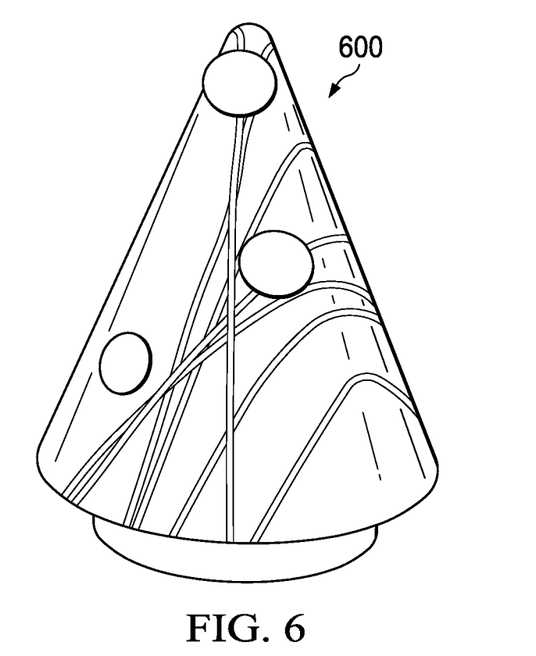
FIGS. 6 through 12 illustrate additional example food products in accordance with this disclosure.

As shown in FIG. 6, a food product 600 is formed in the shape of a Christmas tree. The food product 600 here includes a generally conical-shaped shell with a circular base, although other shapes could be used for the shell or base. The shell and base could both be formed from one or more edible materials, such as chocolate. The food product 600 also includes edible decorations on the shell or the base. One or more ingredients for a heated beverage could be included in the shell.

Figure 7:
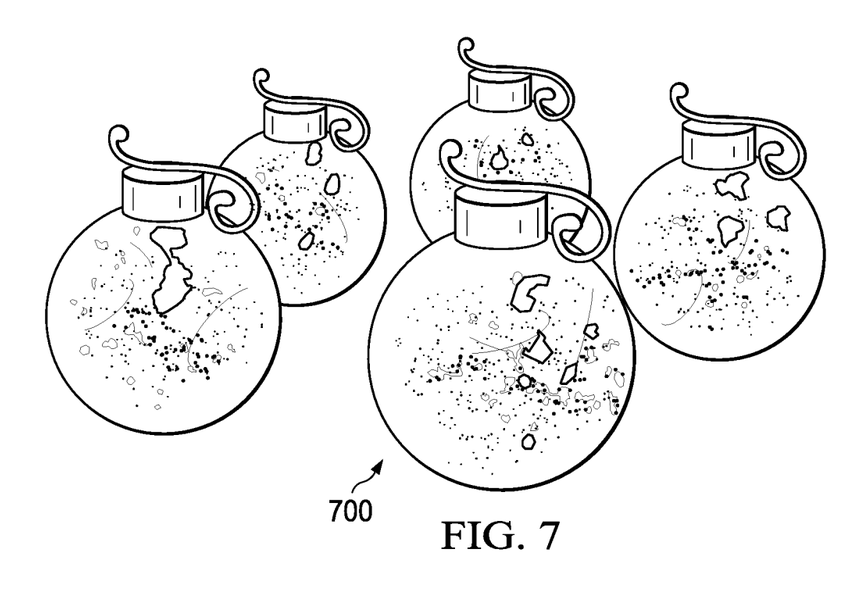

As shown in FIG. 7, a food product 700 is formed in the shape of a Christmas tree ornament. The food product 700 here includes a generally spherical-shaped shell with a connector. The shell and connector could both be formed from one or more edible materials, such as chocolate. Splashes of color or other edible decorations could be placed on the shell or the connector. One or more ingredients for a heated beverage could be included in the shell.

Figure 8:
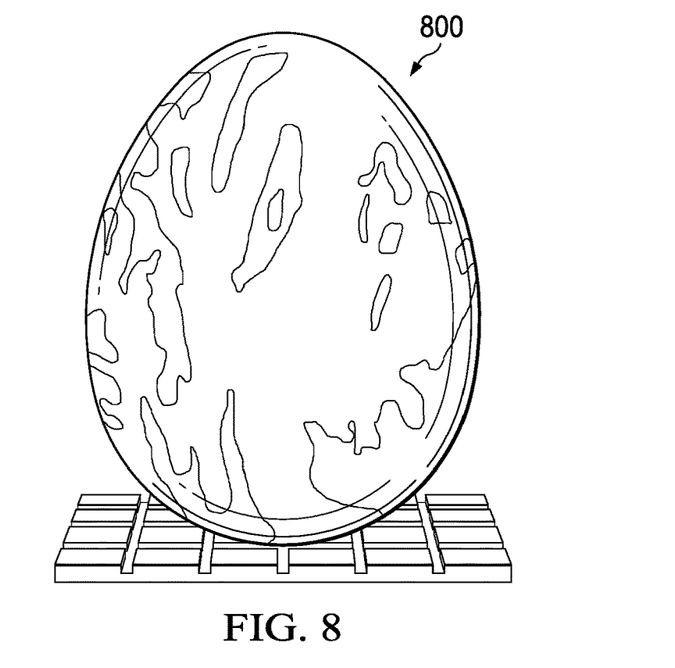

As shown in FIG. 8, a food product 800 is formed in the shape of an Easter egg. The food product 800 here includes a generally egg-shaped shell resting on a base. The shell and base could both be formed from one or more edible materials, such as chocolate. Splashes of color or other edible decorations could be placed on the shell or the base. One or more ingredients for a heated beverage could be included in the shell.

Figure 9:
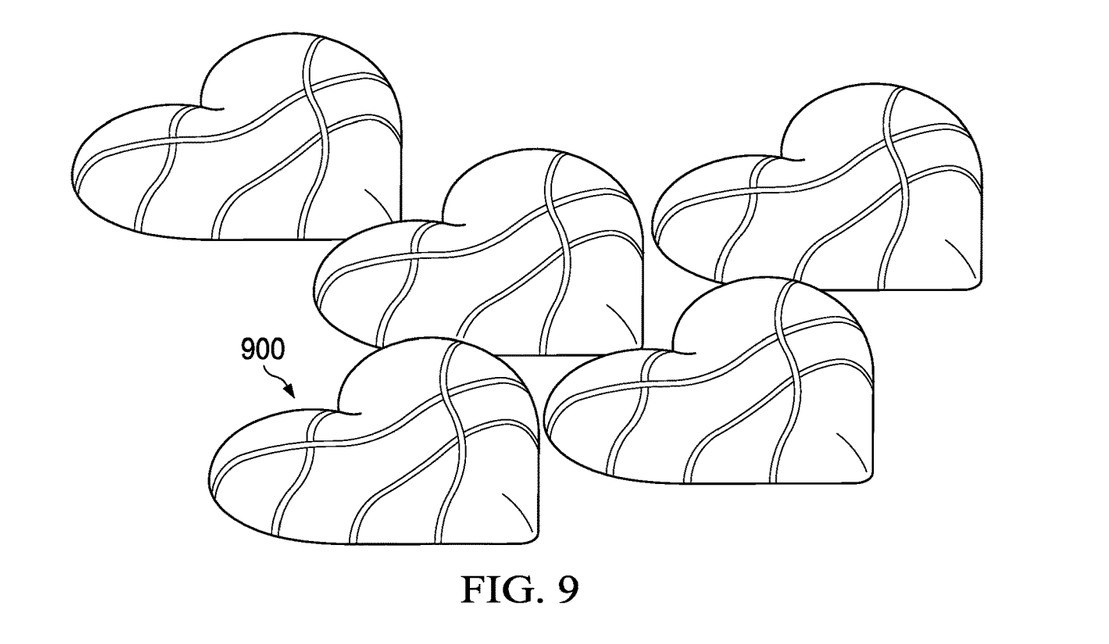

As shown in FIG. 9, a food product 900 is formed in the shape of a heart. The heart could be formed using a heart-shaped shell, with splashes of color or other edible decorations placed on the shell. One or more ingredients for a heated beverage could be included in the shell.

Figure 10:
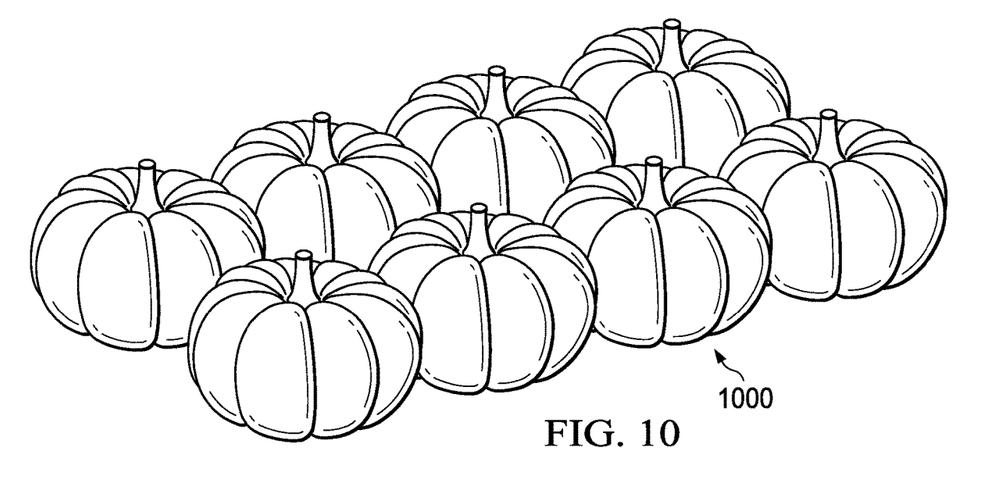

As shown in FIG. 10, a food product 1000 is formed in the shape of a pumpkin. The food product 1000 here includes a generally pumpkin-shaped shell with an edible stem. The shell and stem could both be formed from one or more edible materials, such as chocolate. Colors or other edible decorations could be placed on the shell or stem. One or more ingredients for a heated beverage could be included in the pumpkin-shaped body.

Figure 11:
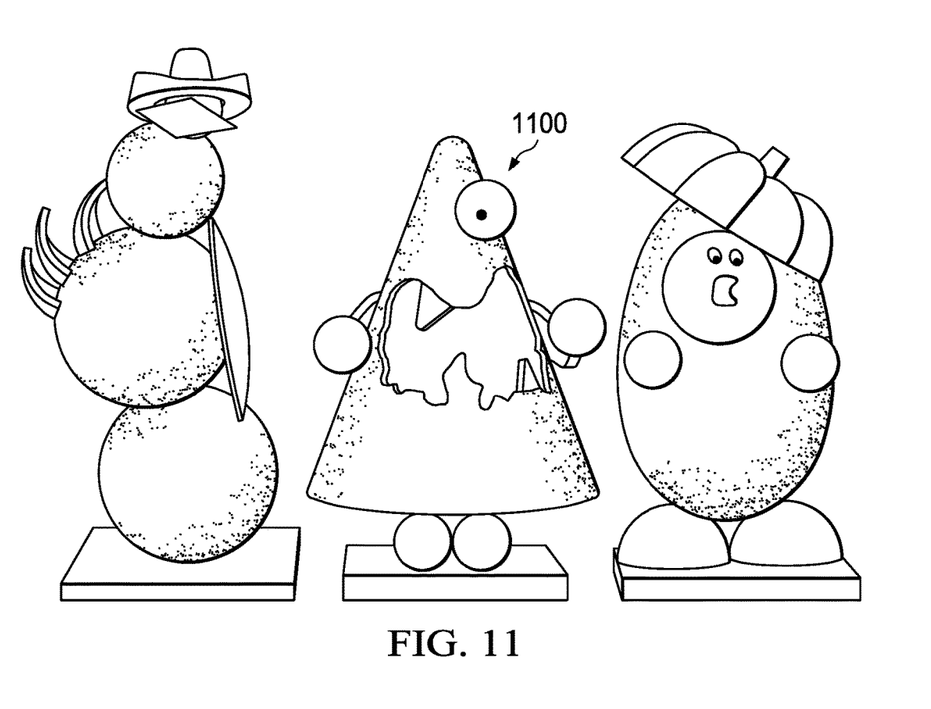

As shown in FIG. 11, various food products 1100 are formed in shapes of monsters or other characters. Each food product 1100 includes one or more shells forming at least part of the body of a character, along with one or more decorations for the character. The shells and decorations could both be formed from one or more edible materials, such as chocolate. One or more ingredients for a heated beverage could be included in at least one of the shells for each character.

Figure 12:
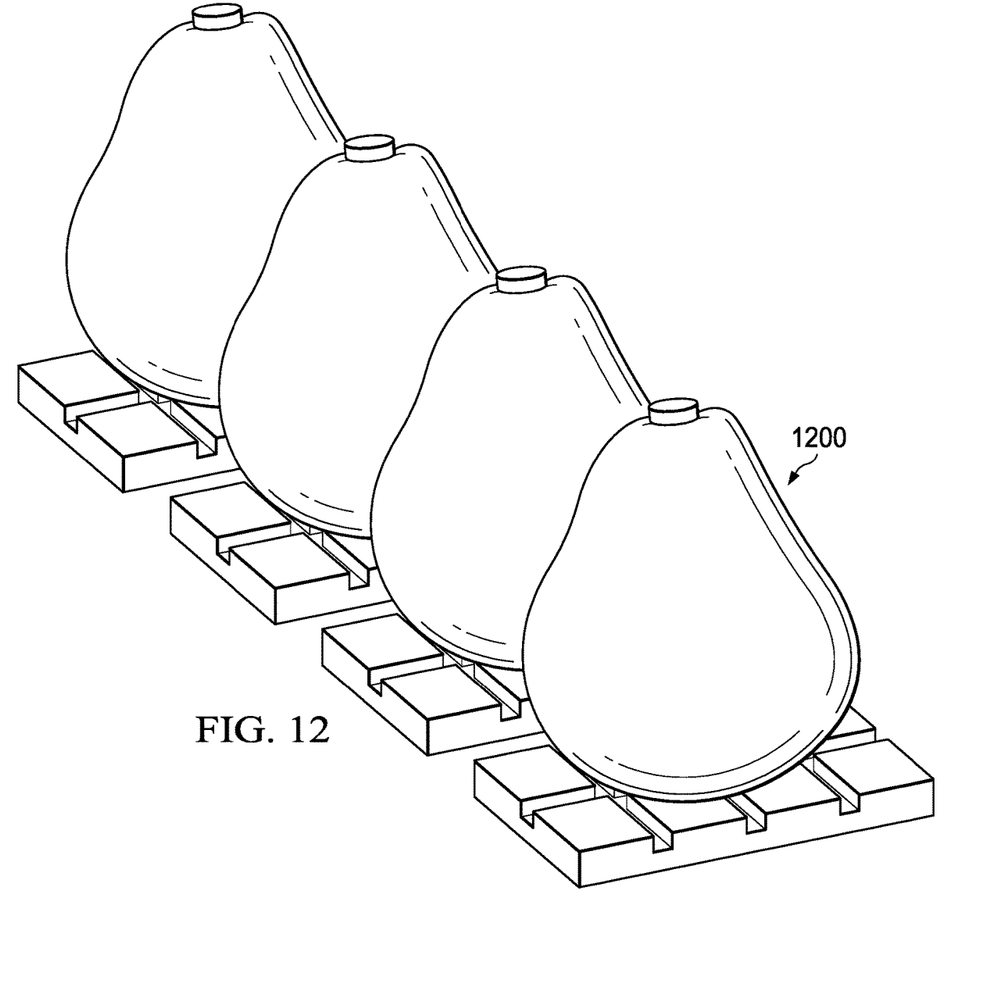

As shown in FIG. 12, a food product 1200 is formed in the shape of a fruit (in this case, a pear). The food product 1200 here includes a generally fruit-shaped shell with a base. The shell and base could both be formed from one or more edible materials, such as chocolate. Colors or other edible decorations could be placed on the shell or base. One or more ingredients for a heated beverage could be included in the fruit-shaped body.

Each food product shown in FIGS. 6 through 12 generally includes at least one shell containing one or more ingredients for a heated beverage. Any suitable ingredients for any suitable heated beverage could be used in each food product. The heated beverage associated with a food product could depend, for example, on the shape or design of the food product.

Although FIGS. 6 through 12 illustrate additional examples of food products, various changes may be made to FIGS. 6 through 12. For example, a food product could have any other suitable design that includes one or more shells containing at least one ingredient for a heated beverage.

Although this disclosure has been described with respect to example embodiments, various modifications and changes may be suggested to one skilled in the art. It is intended that this disclosure encompass such changes and modifications as fall within the scope of the appended claims.

What is claimed is:

1. A food product comprising:
   first and second shells each containing multiple ingredients, the first and second shells attached to each other by an edible bonding agent;
   wherein the shells are configured to be dissolved or melted into a heated liquid to release the multiple ingredients in order to form a heated beverage;
   wherein the multiple ingredients comprise cocoa mix configured to be dissolved into the heated liquid and multiple marshmallows configured to float on a top surface of the heated beverage; and
   wherein each of the shells contains both the cocoa mix and the marshmallows.

2. The food product of claim 1, wherein the shells are formed from chocolate.

3. The food product of claim 1, wherein the shells are spherical and arranged one on top of the other.

4. The food product of claim 1, wherein the edible bonding agent comprises chocolate.

5. The food product of claim 1, wherein the food product is configured to resemble a character.

6. The food product of claim 1, wherein the food product is configured to resemble a snowman.

7. The food product of claim 1, wherein:
   the first shell comprises at least one decorative feature disposed on an exterior surface of the first shell, the at least one decorative feature configured to be released from the first shell when the first shell is dissolved or melted into the heated liquid; and
   the second shell does not include the at least one decorative feature.

8. A method comprising:
   forming first and second shells;
   placing multiple ingredients within each of the shells; and
   attaching the shells to each other using an edible bonding agent;
   wherein the shells are configured to be dissolved or melted into a heated liquid to release the multiple ingredients in order to form a heated beverage;
   wherein the multiple ingredients comprise cocoa mix configured to be dissolved into the heated liquid and multiple marshmallows configured to float on a top surface of the heated beverage; and
   wherein each of the shells contains both the cocoa mix and the marshmallows.

9. The method of claim 8, wherein the shells are formed from chocolate.

10. The method of claim 8, wherein the shells are spherical and arranged one on top of the other.

11. The method of claim 8, wherein the edible bonding agent comprises chocolate.

12. The method of claim 8, wherein the shells together form a food product that resembles a character.

13. The method of claim 8, wherein the shells together form a food product that resembles a snowman.

14. The method of claim 8, wherein forming the shells and placing the multiple ingredients within the shells comprise:
   forming separated portions of the shells;
   placing the ingredients within the separated portions of the shells; and
   joining the separated portions of the shells to form the shells.

15. The method of claim 8, wherein:
   the first shell comprises at least one decorative feature disposed on an exterior surface of the first shell, the at least one decorative feature configured to be released from the first shell when the first shell is dissolved or melted into the heated liquid; and
   the second shell does not include the at least one decorative feature.

16. A method comprising:
   obtaining a food product comprising first and second shells that each contain multiple ingredients within the shells and that are attached to each other by an edible bonding agent; and
   dissolving or melting the shells into a heated liquid to release the multiple ingredients in order to form a heated beverage;
   wherein the multiple ingredients comprise cocoa mix configured to be dissolved into the heated liquid and multiple marshmallows configured to float on a top surface of the heated beverage.

17. The method of claim 16, wherein the shells are formed from chocolate.

18. The method of claim 16, wherein the shells are spherical and arranged one on top of the other.

19. The method of claim 16, wherein the edible bonding agent comprises chocolate.

20. The method of claim 16, wherein:

the first shell comprises at least one decorative feature disposed on an exterior surface of the first shell, the at least one decorative feature configured to be released from the first shell when the first shell is dissolved or melted into the heated liquid; and the second shell does not include the at least one decorative feature.

* * * * *